(12) United States Patent
Randel et al.

(10) Patent No.: US 9,077,455 B2
(45) Date of Patent: Jul. 7, 2015

(54) OPTICAL RECEIVER HAVING A MIMO EQUALIZER

(71) Applicants: Sebastian A. Randel, Aberdeen, NJ (US); Rene-Jean Essiambre, Red Bank, NJ (US); Peter J. Winzer, Aberdeen, NJ (US); Roland Ryf, Aberdeen, NJ (US)

(72) Inventors: Sebastian A. Randel, Aberdeen, NJ (US); Rene-Jean Essiambre, Red Bank, NJ (US); Peter J. Winzer, Aberdeen, NJ (US); Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 254 days.

(21) Appl. No.: 13/729,403

(22) Filed: Dec. 28, 2012

(65) Prior Publication Data
US 2014/0186024 A1    Jul. 3, 2014

(51) Int. Cl.
*H04B 10/60*    (2013.01)
*H04B 10/61*    (2013.01)

(52) U.S. Cl.
CPC ............ *H04B 10/614* (2013.01); *H04B 10/616* (2013.01)

(58) Field of Classification Search
CPC ...... H04B 10/60; H04B 10/61; H04B 10/611; H04B 10/612; H04B 10/613; H04B 10/614; H04B 10/615; H04B 10/616; H04B 10/6164; H04B 10/6165
See application file for complete search history.

(56) References Cited

U.S. PATENT DOCUMENTS

| | | |
|---|---|---|
| 5,049,830 A | 9/1991 | Yoshida |
| 6,650,702 B1 | 11/2003 | Steele |
| 6,683,855 B1 | 1/2004 | Bordogna et al. |
| 7,212,741 B2 | 5/2007 | Myong et a |
| 7,266,310 B1 | 9/2007 | Savory et al. |
| 7,315,575 B2 | 1/2008 | Sun et al. |
| 7,382,984 B2 | 6/2008 | McNicol et al. |
| 7,424,651 B2 | 9/2008 | Domalgala et al. |
| 7,532,820 B2 | 5/2009 | Aronson |
| 7,570,698 B2 | 8/2009 | Chimitt et al. |
| 7,570,889 B2 | 8/2009 | Shastri et al. |
| 7,574,146 B2 | 8/2009 | Chiang et al. |
| 7,606,498 B1 | 10/2009 | Wu et al. |

(Continued)

OTHER PUBLICATIONS

Randel, S. et al.: "Correction of a Local-Oscillator Phase Error in a Coherent Optical Receiver", U.S. Appl. No. 13/410,747, filed Mar. 2, 2012.

(Continued)

*Primary Examiner* — Darren E Wolf
(74) *Attorney, Agent, or Firm* — Mendelsohn, Drucker & Dunleavy, P.C.; Yuri Gruzdkov

(57) ABSTRACT

An optical receiver comprising an optical-to-electrical converter and a digital processor having one or more equalizer stages. The optical-to-electrical converter is configured to mix an optical input signal and an optical local-oscillator signal to generate a plurality of electrical digital measures of the optical input signal. The digital processor is configured to process the electrical digital measures to recover the data carried by the optical input signal. At least one of the equalizer stages is configured to perform signal-equalization processing in which the electrical digital measures and/or digital signals derived from the electrical digital measures are being treated as linear combinations of arbitrarily coupled signals, rather than one or more pairs of 90-degree phase-locked I and Q signals. The latter feature enables the digital processor to more-effectively mitigate the receiver-, link-, and/or transmitter-induced signal impairments because various orthogonality-degrading effects can be mitigated in a relatively straightforward manner.

19 Claims, 10 Drawing Sheets

(56) References Cited

U.S. PATENT DOCUMENTS

| | | |
|---|---|---|
| 7,609,979 B2 | 10/2009 | Taylor |
| 7,734,191 B1 | 6/2010 | Welch et al. |
| 7,747,169 B2 | 6/2010 | Koc |
| 7,747,177 B2 | 6/2010 | Chen et al. |
| 8,050,336 B2 | 11/2011 | Bocquet |
| 8,064,544 B2 | 11/2011 | Li et al. |
| 8,320,769 B2 | 11/2012 | Essiambre et al. |
| 8,331,805 B2 | 12/2012 | Nakashima et al. |
| 8,983,309 B2 | 3/2015 | Harley et al. |
| 2002/0186762 A1 | 12/2002 | Xia et al. |
| 2002/0191689 A1 | 12/2002 | Xia et al. |
| 2007/0110362 A1 | 5/2007 | Shpantzer et al. |
| 2007/0206963 A1 | 9/2007 | Koc |
| 2007/0297806 A1 | 12/2007 | Kaneda et al. |
| 2008/0063121 A1 | 3/2008 | Geller et al. |
| 2008/0152361 A1 | 6/2008 | Chen et al. |
| 2009/0142076 A1 | 6/2009 | Li et al. |
| 2010/0002810 A1 | 1/2010 | Li et al. |
| 2010/0034186 A1 | 2/2010 | Zhou et al. |
| 2010/0232805 A1 | 9/2010 | Cai |
| 2011/0002689 A1* | 1/2011 | Sano et al. ............ 398/44 |
| 2011/0038631 A1 | 2/2011 | Doerr |
| 2011/0069975 A1 | 3/2011 | Liu et al. |
| 2011/0129038 A1 | 6/2011 | Miyoshi et al. |
| 2011/0217043 A1 | 9/2011 | Pfau |
| 2011/0318021 A1 | 12/2011 | Zhou |

OTHER PUBLICATIONS

Xie, C.: "Coherent Optical Receivers for Colorless Reception", U.S. Appl. No. 13/537,467, filed Jun. 29, 2012.

Xie, C. et al.: "Colorless Coherent Receiver Using 3×3 Coupler Hybrids and Single-Ended Detection", Optics 25 Express, 2012, vol. 20, No. 2, pp. 1164-1171.

Vangelista, Lorenzo, et al., "Efficient Implementations and Alternative Architectures for OFDM-OQAM Systems," Transactions on Communications, IEEE, vol. 49, No. 4, Aug. 2002, pp. 664-675.

Pfau, Timo et al., "Hardware-Efficient Coherent Digital Receiver Concept With Feedforward Carrier Recovery for M-QAM Constellations," Journal of Lightwave Technology, vol. 27, No. 8, 2009, pp. 989-999.

Saltzberg, Burton R., "Performance of an Efficient Parallel Data Transmission System," Transactions on Communication Technology, IEEE, vol. 15, No. 6, 1967, pp. 805-811.

Winzer, Peter J., et al., U.S. Patent Application entitled, "Frequency-Resolved I/Q-Signal Imbalance Correction for Coherent Optical Receivers," U.S. Appl. No. 12/876,489, filed Sep. 7, 2010.

\* cited by examiner

100

200

400

500

900

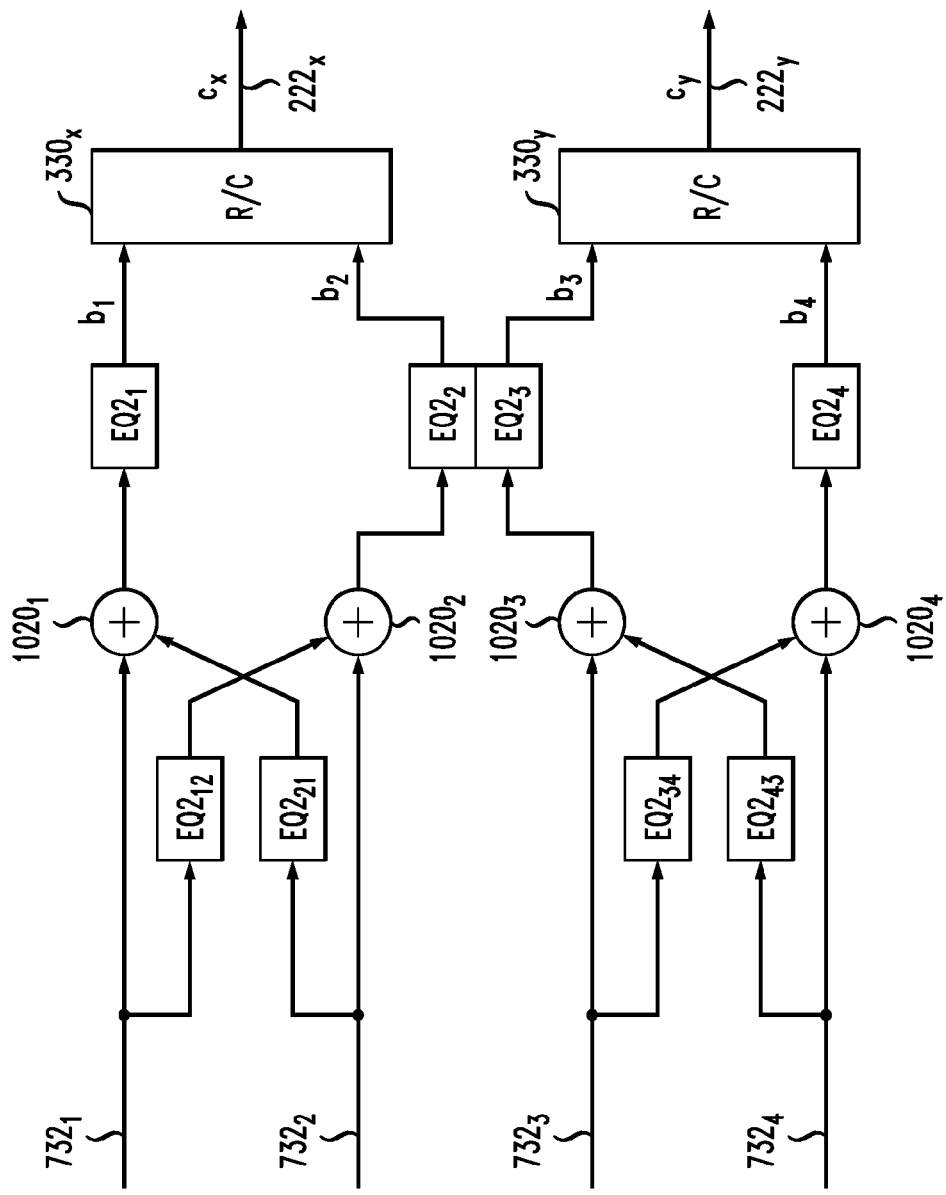

OPTICAL RECEIVER HAVING A MIMO EQUALIZER

BACKGROUND

1. Field

The present invention relates to optical communication equipment and, more specifically but not exclusively, to multiple-input multiple-output (MIMO) signal equalization.

2. Description of the Related Art

This section introduces aspects that may help facilitate a better understanding of the invention(s). Accordingly, the statements of this section are to be read in this light and are not to be understood as admissions about what is in the prior art or what is not in the prior art.

A coherent optical-detection scheme is capable of detecting not only the amplitude of an optical signal, but also the signal's phase. These capabilities make coherent optical detection compatible with the use of spectrally efficient modulation formats, such as quadrature-amplitude modulation (QAM) and phase-shift keying (PSK) in their various forms. Compared to non-coherent optical detectors, coherent optical detectors offer relatively easy wavelength tunability, good rejection of interference from adjacent channels in wavelength-division-multiplexing (WDM) systems, linear transformation of the electromagnetic field into an electrical signal for effective application of modern digital-signal-processing techniques, and an opportunity to use polarization-division multiplexing (PDM).

A conventional coherent optical receiver usually includes a signal equalizer configured to reduce the adverse effects of certain transport-link impairments, such as chromatic dispersion and polarization-mode dispersion. However, the end-to-end transmission of data may cause additional impairments at the transmitter and/or the receiver. For example, the transmitter side can subject the signal to the effects of a skew between the in-phase (I) and quadrature (Q) signal components, radio-frequency (RF) crosstalk between the electrical signals that drive the electro-optical modulator (EOM), and an imperfect common-mode bias in the EOM. In addition, the various digital-to-analog (D/A) converters and driver circuits in the X- and Y-polarization branches of the transmitter can have noticeably different impulse responses. The receiver side can subject the signal to the effects associated with at least some of the aforementioned and/or other additional impairments. Furthermore, in an optical communication system with additional MIMO dimensions, such as a system that employs multimode fibers and space-division multiplexing, a relatively large number of additional circuit elements may introduce other types of signal impairments.

SUMMARY OF SOME SPECIFIC EMBODIMENTS

Disclosed herein are various embodiments of an optical receiver comprising an optical-to-electrical converter and a digital processor having one or more equalizer stages. The optical-to-electrical converter is configured to mix an optical input signal and an optical local-oscillator signal to generate a plurality of electrical digital measures of the optical input signal. The digital processor is configured to process the electrical digital measures to recover the data carried by the optical input signal. At least one of the equalizer stages is configured to perform signal-equalization processing in which the electrical digital measures and/or digital signals derived from the electrical digital measures are treated as linear combinations of arbitrarily coupled signals, rather than one or more pairs of 90-degree phase-locked I and Q signals. The latter feature may enable the digital processor to more-effectively mitigate the receiver-, link-, and/or transmitter-induced signal impairments, e.g. because various orthogonality-degrading effects can be mitigated at the receiver in a relatively straightforward manner.

In some embodiments, the digital processor has a carrier-recovery circuit placed between two equalizer stages. At least one of the equalizer stages comprises a plurality of equalization filters configured to operate on real-valued signals, with each equalization filter being a finite-impulse-response filter implemented using a tapped delay line or a Fourier-transform-based frequency-domain filter. Different equalization filters within the equalizer stage(s) can be connected to one another in a manner that enables the digital processor to sequentially address the various signal impairments traceable to specific hardware components in the optical-transport system, such as, without limitation, relative differences in the I and Q paths in the receiver, I/Q imbalances in each of the polarization branches in the receiver, chromatic dispersion in the fiber link, polarization rotation in the fiber link, polarization-mode dispersion in the fiber link, I/Q imbalances in each of the polarization branches in the transmitter, and relative differences in the I and Q paths in the transmitter.

According to one embodiment, provided is an apparatus comprising: an optical-to-electrical converter configured to mix an optical input signal and an optical local-oscillator signal to generate a first electrical digital measure (e.g., $152_1$) and a second electrical digital measure (e.g., $152_2$) of the optical input signal; and a digital processor configured to process the first and second electrical digital measures to recover data carried by the optical input signal. The digital processor comprises: a first equalization filter (e.g., $[H_{11}]$ in FIG. 6) configured to apply respective signal-equalization processing to the first electrical digital measure to generate a first processed signal; a second equalization filter (e.g., $[H_{21}]$ in FIG. 6) configured to apply respective signal-equalization processing to the first electrical digital measure to generate a second processed signal; a third equalization filter (e.g., $[H_{12}]$ in FIG. 6) configured to apply respective signal-equalization processing to the second electrical digital measure to generate a third processed signal; and a fourth equalization filter (e.g., $[H_{22}]$ in FIG. 6) configured to apply respective signal-equalization processing to the second electrical digital measure to generate a fourth processed signal. The digital processor is further configured to: combine the first processed signal and the third processed signal to generate a real part (e.g., $b_1$ in FIG. 6) of a first complex-valued digital measure (e.g., $212x$ in FIG. 6); combine the second processed signal and the fourth processed signal to generate an imaginary part (e.g., $b_2$ in FIG. 6) of the first complex-valued digital measure; and recover the data carried by the optical input signal based on the first complex-valued digital measure.

According to another embodiment, provided is an apparatus comprising: an optical-to-electrical converter configured to mix an optical input signal and an optical local-oscillator signal to generate a first electrical digital measure (e.g., $152_1$) and a second electrical digital measure (e.g., $152_2$) of the optical input signal; and a digital processor configured to process the first and second electrical digital measures to recover data carried by the optical input signal. The digital processor comprises: a first equalizer stage (e.g., $710_1$) configured to apply respective signal-equalization processing to the first electrical digital measure and the second electrical digital measure to generate a first complex-valued digital measure (e.g., $712x$); a digital circuit (e.g., 220 in FIG. 7) configured to apply frequency-offset processing to the first complex-valued digital measure to generate a second complex-valued digital measure (e.g., 722x), with said frequency-offset processing being directed at reducing effects of a carrier-frequency mismatch between the optical input signal and the optical local-oscillator signal; and a second equalizer stage (e.g., $710_2$) configured to apply respective signal-equalization processing to a real part and an imaginary part of the second complex-valued digital measure to generate a third complex-valued digital measure (e.g., 222x in FIG. 7). The digital processor is further configured to recover the data carried by the optical input signal based on the third complex-valued digital measure.

BRIEF DESCRIPTION OF THE DRAWINGS

Other aspects, features, and benefits of various embodiments of the invention will become more fully apparent, by way of example, from the following detailed description and the accompanying drawings, in which:

FIG. 10 shows a block diagram of an equalizer that can be used in the ECR module of FIG. 7 according to another alternative embodiment of the disclosure.

DETAILED DESCRIPTION

Figure 1:
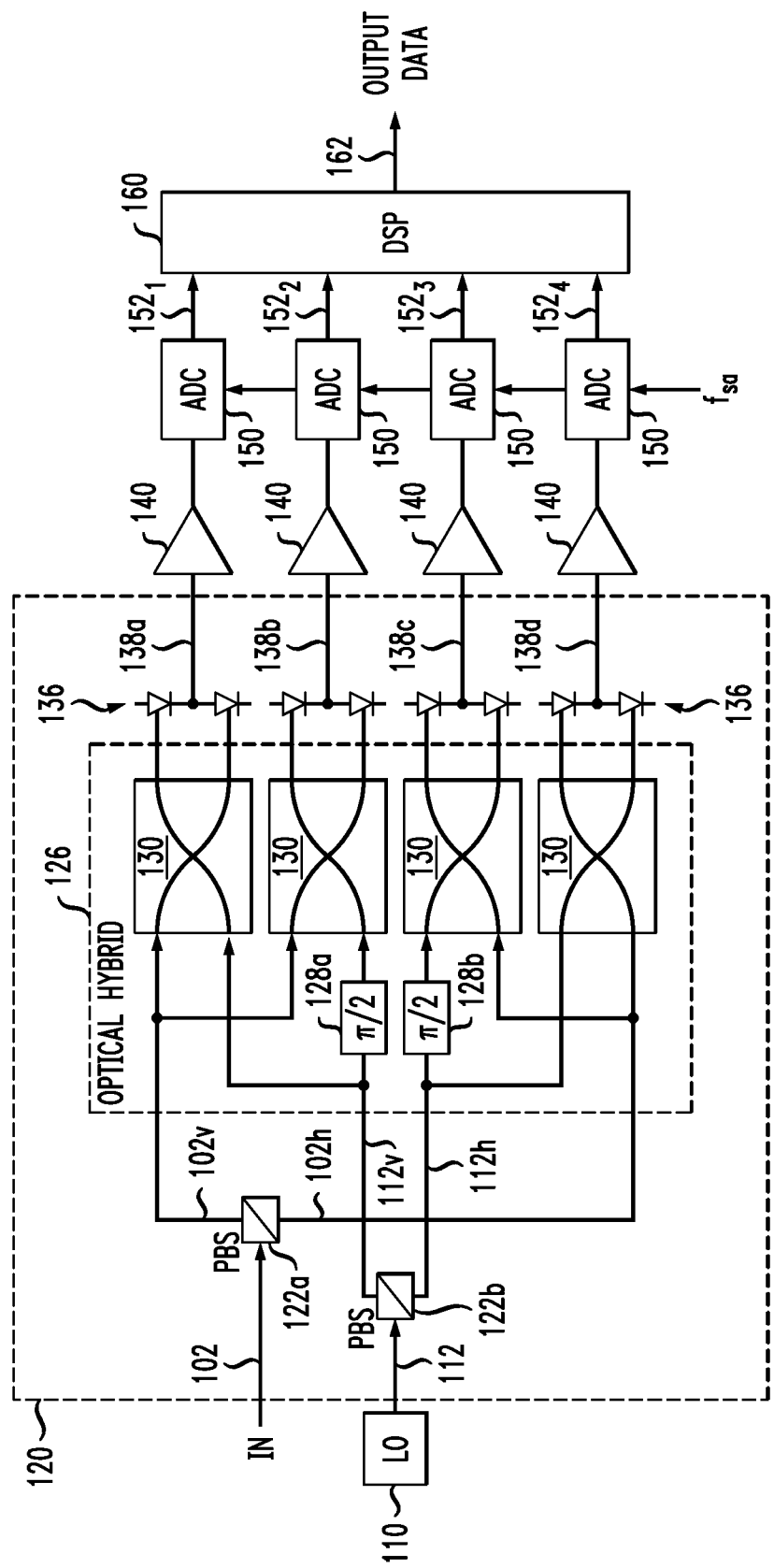
FIG. 1 shows a block diagram of a coherent optical receiver according to an embodiment of the disclosure.

FIG. 1 shows a block diagram of a coherent optical receiver 100 according to an embodiment of the disclosure. Receiver 100 receives an optical input PDM signal 102, e.g., from a remote transmitter, via an external optical transport link (not explicitly shown in FIG. 1). Optical signal 102 is applied to an optical-to-electrical (O/E) converter 120 that converts that optical signal into four electrical signals 138a-138d. Each of signals 138a-138d may be amplified in a corresponding amplifier 140 coupled to a corresponding analog-to-digital (A/D) converter (ADC) 150. Each A/D converter 150 samples the output of the corresponding amplifier 140 at an appropriate sampling frequency ($f_{sa}$) to produce a corresponding one of four digital signals $152_1$-$152_4$. Digital signals $152_1$-$152_4$ are applied to a digital signal processor (DSP) 160 that processes them, e.g., as described in more detail below in reference to FIGS. 2-10, to recover the data streams originally encoded onto the PDM components of optical signal 102 at the remote transmitter. DSP 160 then outputs the recovered data via an output signal 162.

In one embodiment, receiver 100 may include a set of electrical low-pass filters (not explicitly shown in FIG. 1), each inserted between O/E converter 120 and the respective one of A/D converters 150. The use of these filters may help to reduce noise and prevent aliasing.

O/E converter 120 implements a polarization-diversity intradyne-detection scheme using an optical local-oscillator (LO) signal 112 generated by an optical LO source 110. Polarization beam splitters (PBSs) 122a and 122b decompose signals 102 and 112, respectively, into two respective orthogonally polarized components, illustratively vertically polarized components 102v and 112v and horizontally polarized components 102h and 112h. These polarization components are then directed to an optical hybrid 126.

In optical hybrid 126, each of polarization components 102v, 112v, 102h, and 112h is split into two (attenuated) copies, e.g., using a conventional 3-dB power splitter (not explicitly shown in FIG. 1). A relative phase shift of about 90 degrees (π/2 radian) is then applied to one copy of component 112v and one copy of component 112h using phase shifters 128a-128b, respectively. The various copies of signals 102v, 112v, 102h, and 112h are optically mixed with each other as shown in FIG. 1 using four optical signal mixers 130, and the mixed signals produced by the mixers are detected by eight photo-detectors (e.g., photodiodes) 136. Photo-detectors 136 are arranged in pairs, as shown in FIG. 1, and the output of each photo-detector pair is a corresponding one of electrical signals 138a-138d. This configuration of photo-detectors 136 is a differential configuration that helps to reduce noise and improve DC balancing. In an alternative embodiment, O/E converter 120 can have four photo-detectors 136, one per optical signal mixer 130, configured for single-ended detection of the corresponding optical signals. In yet another alternative embodiment, optical hybrid 126 may be replaced by a 3×3 optical coupler having three photodiodes per polarization at its output, e.g., as described in (i) U.S. patent application Ser. No. 13/537,467, by Chongjin Xie and Peter Winzer, filed on Jun. 29, 2012, and entitled "Coherent Optical Receivers For Colorless Reception" and (ii) a paper by Chongjin Xie, Peter J. Winzer, Gregory Raybon, et al. "Colorless Coherent Receiver Using 3×3 Coupler Hybrids and Single-Ended Detection," OPTICS EXPRESS, 2012, Vol. 20, No. 2, pp. 1164-1171, both of which are incorporated herein by reference in their entirety.

Example optical hybrids that are suitable for use in optical receiver 100 are described, e.g., in U.S. Patent Application Publication Nos. 2007/0297806 and 2011/0038631, both of which are incorporated herein by reference in their entirety.

In a representative embodiment, DSP 160 performs (i) signal-equalization processing and (ii) carrier- and data-recovery (CDR) processing. The signal-equalization processing is directed at reducing the detrimental effects of various signal impairments, e.g., caused by circuit imperfections at the remote transmitter, linear and nonlinear forms of signal distortion in the optical transport link, and circuit imperfections in the front end of receiver 100. The CDR processing is generally directed at compensating the frequency mismatch between the carrier frequencies of optical LO signal 112 and input signal 102, reducing the effects of phase noise, and recovering the transmitted data.

Ideally, digital signals $152_1$-$152_2$ represent the I and Q components, respectively, of the first PDM (e.g., X-polarized) component of the original optical communication signal generated by the remote transmitter, and digital signals $152_3$-$152_4$ represent the I and Q components, respectively, of the second PDM (e.g., Y-polarized) component of that optical communication signal. However, the usually present misalignment between the principal polarization axes of the remote transmitter and the principal polarization axes of receiver 100 and polarization rotation in the optical fiber generally cause each of digital signals $152_1$-$152_4$ to be a convoluted signal that has signal distortions and/or contributions from both of the original PDM components. The train of signal processing implemented in DSP 160 is generally directed at de-convolving digital signals $152_1$-$152_4$ and reducing the effects of those signal distortions so that the encoded data can be recovered for output signal 162 with an acceptably low bit-error rate (BER).

Conventional signal-equalization processing treats digital signals $152_1$-$152_4$ as being linear combinations of two pairs of I/Q signals, with the I and Q signals in each pair being phase-locked with respect to one another with a relative phase shift of 90 degrees. In contrast, the signal-equalization processing implemented in DSP 160 is configured to treat digital signals $152_1$-$152_4$ as being linear combinations of arbitrarily coupled (e.g., not necessarily 90-degree phase-locked) signals. This feature enables DSP 160 to more-fully compensate the receiver-induced signal impairments and the link-induced signal impairments, e.g., because various orthogonality-degrading effects can now be taken into account and compensated for to a significant degree in receiver 100. In some embodiments, DSP 160 can additionally be configured to at least partially compensate the transmitter-induced signal impairments using a conceptually similar treatment of digital signals generated in the DSP after frequency-offset compensation. These capabilities of receiver 100 can advantageously be used, e.g., to relax the specification requirements to various optical devices and/or opto-electronic circuits used in the receiver, transport link, and transmitter, thereby potentially providing significant cost savings for the manufacturer and/or operator of the corresponding optical-transport system.

Figure 2:
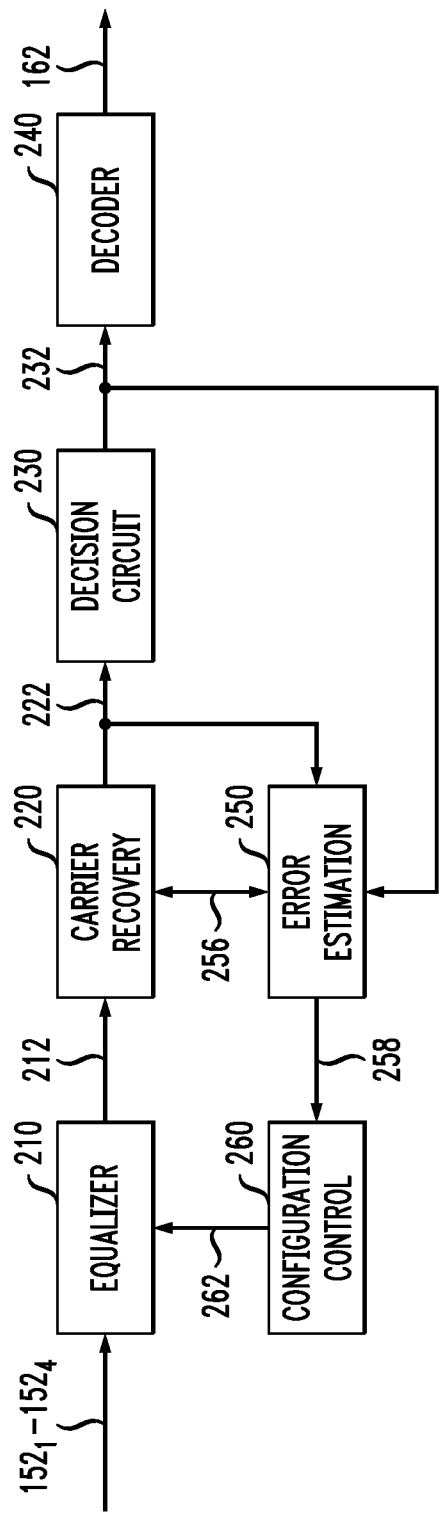
FIG. 2 shows a block diagram of a digital signal processor that can be used in the coherent optical receiver of FIG. 1 according to an embodiment of the disclosure.

FIG. 2 shows a block diagram of a DSP 200 that can be used as DSP 160 (FIG. 1) according to an embodiment of the disclosure. For illustration purposes, DSP 200 is shown in FIG. 2 as being configured to receive digital signals $152_1$-$152_4$ and generate output signal 162 (also see FIG. 1). Alternative configurations of DSP 200 are also contemplated, including those corresponding to possible uses of this DSP in devices different from receiver 100.

For example, DSP 200 can be configured to receive digital input signals that have been generated by preprocessing digital signals $152_1$-$152_4$. One possible type of preprocessing is directed at adapting the rate of signal samples in digital signals $152_1$-$152_4$ to a rate suitable for the signal-processing algorithms implemented in the downstream modules of DSP 200. In one embodiment, each of digital signals $152_1$-$152_4$ carries a respective stream of digital samples that occur at the sampling frequency of A/D converters 150 (see FIG. 1). The preprocessing can be used to appropriately retime and/or resample digital signals $152_1$-$152_4$ to generate substitute digital signals in which digital samples occur at a rate that is synchronized with the symbol rate in optical input signal 102 (FIG. 1), e.g., by being an integer multiple of the latter rate. Other suitable types of preprocessing can also be used.

In one embodiment, DSP 200 includes an equalizer 210 configured to perform the following two functions.

First, in each time slot, equalizer 210 transforms input vector A into intermediate vector B in accordance with Eq. (1):

$$b_i = \sum_{k=1}^{4} H_{ik} * a_k \quad (1)$$

where $b_i$ is the i-th component of intermediate vector B, where i=1, 2, 3, 4; $a_k$ is the k-th component of input vector A, where k=1, 2, 3, 4; $H_{ik}$ is a respective transfer function; and the "*" symbol denotes the convolution operation. In the configuration of equalizer 210 shown in FIG. 2, in each time slot, vector component $a_k$ has a value provided by digital signal $152_k$. In one embodiment, all sixteen transfer functions $H_{ik}$ are non-zero. In some embodiments, some of the sixteen transfer functions $H_{ik}$ can be zero. Transfer functions $H_{ik}$ are controlled by a controller 260, via a control signal 262, and are normally frequency dependent. Control signal 262 is a multi-component control signal that can be updated in each time slot or, if appropriate, less frequently based on a feedback signal 258 received by controller 260 from an error estimator 250.

Second, equalizer 210 transforms intermediate vector B into a pair of complex values, e.g., $c_x$ and $c_y$, in accordance with Eqs. (2a)-(2b):

$$c_x = b_1 + b_2 \quad (2a)$$

$$c_y = b_3 + jb_4 \quad (2b)$$

Equalizer 210 then directs this pair of complex values, via a bus 212, to a carrier-recovery circuit 220.

In an alternative embodiment, DSP 200 may include an equalizer designed to process digital signals corresponding to a number of MIMO degrees of freedom that is different from four (as expressed by Eq. (1)), provided that the front-end circuit of the corresponding receiver is designed to generate the corresponding different number of digital signals for processing in the DSP. Representative embodiments of suitable front-end circuits are disclosed, e.g., in U.S. Pat. No. 8,320, 769, which is incorporated herein by reference in its entirety.

In one embodiment, carrier-recovery circuit 220 and error estimator 250 are configured to perform signal processing that mitigates the detrimental effects of (i) a carrier-frequency mismatch between optical LO signal 112 and input signal 102 (see FIG. 1) and (ii) the local-oscillator phase error. Various signal-processing techniques that can be used to implement frequency-mismatch compensation in carrier-recovery circuit 220 are disclosed, e.g., in U.S. Pat. No. 7,747,177 and U.S. Patent Application Publication No. 2008/0152361, both of which are incorporated herein by reference in their entirety. Representative signal-processing techniques that can be used to implement phase-error correction in carrier-recovery circuit 220 are disclosed, e.g., in U.S. patent application Ser. No. 13/410,747, filed on Mar. 2, 2012, and entitled "CORRECTION OF A LOCAL-OSCILLATOR PHASE ERROR IN A COHERENT OPTICAL RECEIVER," which patent application is incorporated herein by reference in its entirety.

A digital signal 222 generated by carrier-recovery circuit 220 is applied to a decision circuit 230. Decision circuit 230 is configured to use the complex values conveyed by digital signal 222 to appropriately map each complex value onto a constellation point of the operative constellation and, based on said mapping, generate a digital signal 232 that carries the complex values that represent the mapped-to constellation points. A decoder circuit 240 then processes digital signal 232 to recover the corresponding encoded data for output signal 162. In one embodiment, decoder circuit 240 may perform digital processing that implements forward error correction (FEC) based on data redundancies (if any) in optical input signal 102. Many FEC methods suitable for use in decoder circuit 240 are known in the art. Several representative examples of such methods are disclosed, e.g., in U.S. Pat. Nos. 7,734,191, 7,574,146, 7,424,651, 7,212,741, and 6,683,855, all of which are incorporated herein by reference in their entirety.

Copies of digital signals 222 and 232 are also provided to error estimator 250. In one embodiment, error estimator 250 is configured to estimate an error corresponding to the differences between digital signals 222 and 232. Error estimator 250 then applies a suitable (e.g., a least-mean squares, LMS, or a constant-modulus, CMA) algorithm to the estimated errors to generate feedback signals 256 and 258 for carrier-recovery circuit 220 and controller 260, respectively, in a manner that tends to minimize the error values or at least keep them below an acceptable threshold level.

Figure 3:
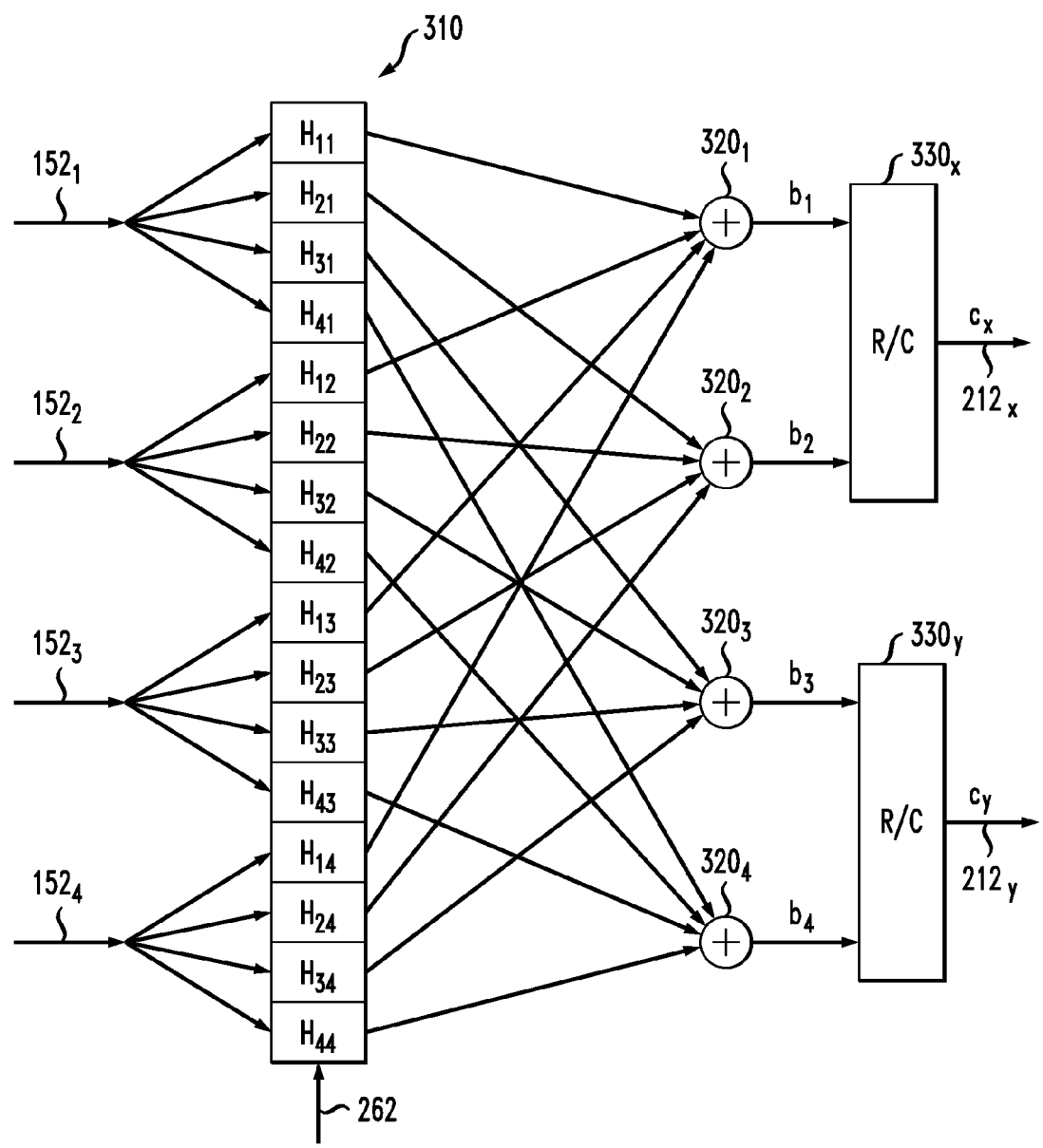
FIG. 3 shows a block diagram of an equalizer that can be used in the digital signal processor of FIG. 2 according to an embodiment of the disclosure.

FIG. 3 shows a block diagram of an equalizer 300 that can be used as equalizer 210 (FIG. 2) according to an embodiment of the disclosure. For illustration purposes, equalizer 300 is shown in FIG. 3 as being configured to receive digital signals 152$_1$-152$_4$ and to output the generated complex values $c_x$ and $c_y$ on lines 212$x$ and 212$y$, respectively, of bus 212 (also see FIG. 2). As further explained below, e.g., in reference to FIG. 7, equalizer 300 can alternatively be configured to receive digitals signals different from digital signals 152$_1$-152$_4$ and/or output the generated complex values on a bus different from bus 212.

Equalizer 300 comprises an array 310 of sixteen equalization filters, each marked in FIG. 3 using the filter's transfer function, $H_{ik}$, where i=1, 2, 3, 4 and k=1, 2, 3, 4. Possible embodiments of individual equalization filters used in array 310 are described in more detail below in reference to FIGS. 4-5. Together with adders 320$_1$-320$_4$, filter array 310 implements the signal transform expressed by Eq. (1).

Equalizer 300 further comprises real-to-complex (RIC) converters 330$x$ and 330$y$ configured to perform the signal transforms expressed by Eqs. (2a) and (2b), respectively.

Figure 4:
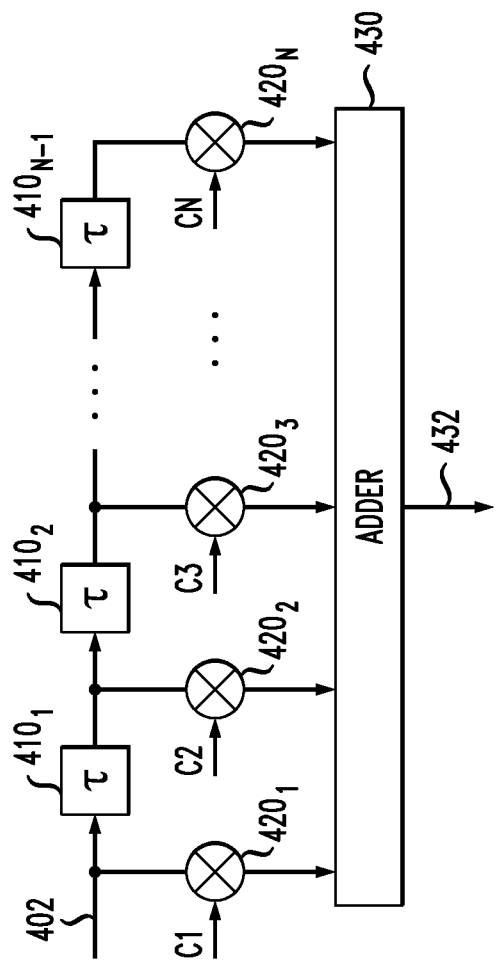
FIG. 4 shows a block diagram of an individual equalization filter that can be used in the equalizer shown in FIG. 3 according to an embodiment of the disclosure.

FIG. 4 shows a block diagram of a finite-impulse-response (FIR) filter 400 that can be used to implement any of the sixteen equalization filters in array 310 (FIG. 3) according to an embodiment of the disclosure. Filter 400 is configured to receive an input signal 402 and generate a filtered output signal 432. When filter 400 is used as equalization filter [$H_{ik}$] in array 310, input signal 402 is a copy of digital signal 152$_k$, and filtered output signal 432 is directed to adder 320$_i$ (see FIG. 3).

Filter 400 is an N-tap FIR filter comprising (i) N–1 delay elements 410$_1$-410$_{N-1}$; (ii) N multipliers 420$_1$-420$_N$; and (iii) an adder 430. Each of delay elements 410$_1$-410$_{N-1}$ is configured to introduce a time delay T. Each of multipliers 420$_1$-420$_N$ is configured to multiply a corresponding delayed copy of input signal 402 by a respective real-valued coefficient $C_n$, where i=1, 2, . . . , N. Adder 430 is configured to sum the output signals generated by multipliers 420$_1$-420$_N$ to generate filtered output signal 432. In one embodiment, the number (N) of taps in filter 400 can be between two and twelve. In an alternative embodiment, a significantly larger number of taps, e.g., about five hundred, can similarly be used.

Figure 5:
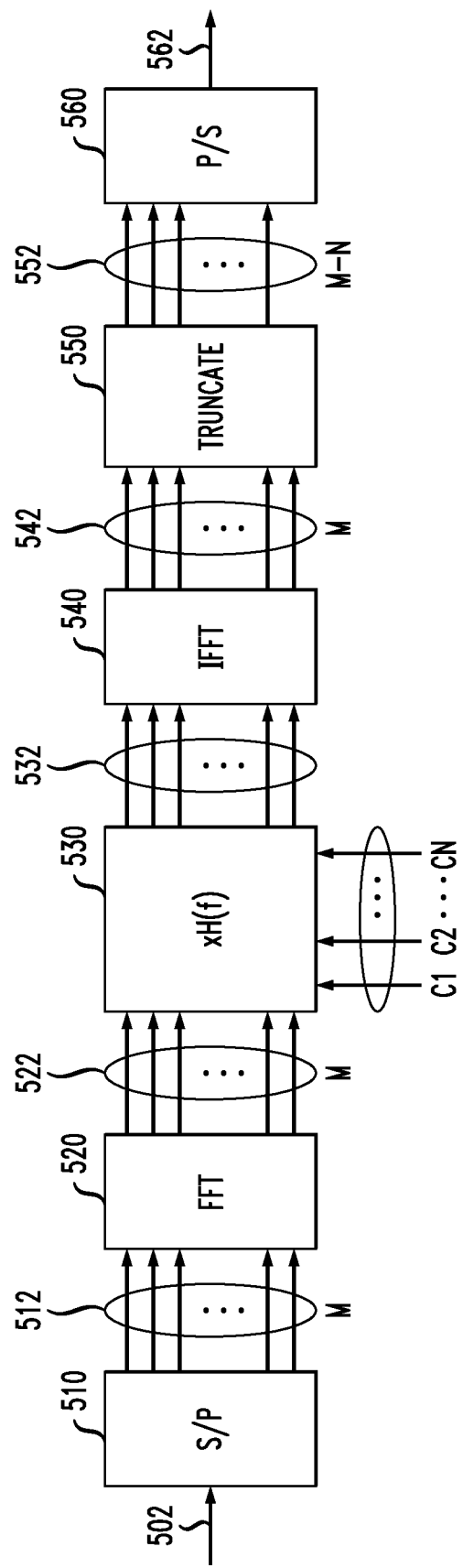
FIG. 5 shows a block diagram of an individual equalization filter that can be used in the equalizer shown in FIG. 3 according to an alternative embodiment of the disclosure.

The values of coefficients $C_1$-$C_N$ applied by multipliers 420$_1$-420$_N$ can be changed over time and are set, e.g., by controller 260 via control signal 262 (see FIG. 2). In operation, different instances (copies) of FIR filter 400 in array 310 (FIG. 3) are typically configured to use different respective sets of coefficients $C_1$-$C_N$. FIG. 5 shows a block diagram of a frequency-domain equalization filter 500 that can be used to implement any of the sixteen equalization filters in array 310 (FIG. 3) according to an alternative embodiment of the disclosure. Filter 500 is configured to receive an input signal 502 and to generate a filtered output signal 562. When filter 500 is used as equalization filter [$H_{ik}$] in array 310, input signal 502 is a copy of digital signal 152$_k$, and filtered output signal 562 is directed to adder 320$_i$ (see FIG. 3).

As the name of filter 500 implies, this filter is designed to apply a frequency-dependent transfer function, H(f), in the frequency domain, where f is frequency. Accordingly, filter 500 includes a fast Fourier-transform (FFT) module 520 and an inverse-FFT (IFFT) module 540, with a transfer-function-application module (×H(f)) 530 sandwiched between these two modules. Controller 260 and control signal 262 (see FIG. 2) can be used to control transfer-function-application module 530 in a manner similar to that used for the control of multipliers 420$_1$-420$_N$ in filter 400 (FIG. 4). For example, if filter 500 is designed to be a functional analog of an N-tap time-domain FIR filter, such as filter 400, then transfer function H(f) applied by module 520 can be related to coefficients $C_1$-$C_N$ applied by multipliers 420$_1$-420$_N$ to the respective tapped signals in filter 400, for example, as follows:

$$H(f) = \sum_{n=1}^{N} C_n e^{-2\pi j(n-1) f \tau} \quad (3)$$

In one embodiment, filter 500 is configured to operate by repeating the sequence of operations described in the next paragraph on a set of digital values provided by input signal 502, with the set being located within a time window having M time slots and with said time window being slid forward by M–N time slots each time the sequence is completed.

A serial-to-parallel (S/P) converter 510 generates a set 512 of M digital values, e.g., by placing the digital values received via input signal 502, in the order of their arrival, into appropriate positions (lines) within set 512. FFT module 520 then applies a Fourier transform to set 512, thereby generating a set 522 of M spectral samples. Transfer-function-application module 530 applies transfer function H(f) to set 522, thereby generating a corrected set 532 of M spectral samples. IFFT module 540 applies an inverse Fourier transform to set 532, thereby generating a set 542 of M corrected digital values. A truncating module 550 truncates set 542 down to M–N digital values, e.g., by removing an appropriate number of digital values from the beginning of set 542 or from the end of set 542, or both. The result is a truncated set 552 having M–N corrected digital values. Finally, a parallel-to-serial (P/S) converter 560 serializes truncated set 552, thereby generating a corresponding segment of filtered output signal 562.

One of ordinary skill in the art will appreciate that filters 400 (FIG. 4) and 500 (FIG. 5) are but two examples of digital filters that can be used as individual equalization filters in array 310 (FIG. 3). More specifically, FIR filters different from FIR filter 400 (e.g., an FIR filter with decision feedback) can similarly be used. A suitable FIR filter with decision feedback is disclosed, e.g., in each of U.S. Pat. No. 6,650,702 and U.S. Patent Application Publication Nos. 2002/0186762 and 2002/0191689, all of which are incorporated herein by reference in their entirety. Frequency-domain filters different from filter 500 can also be used. For example, a suitable frequency-domain filter is disclosed, e.g., in U.S. Pat. No. 8,050,336, which is incorporated herein by reference in its entirety.

Figure 6:
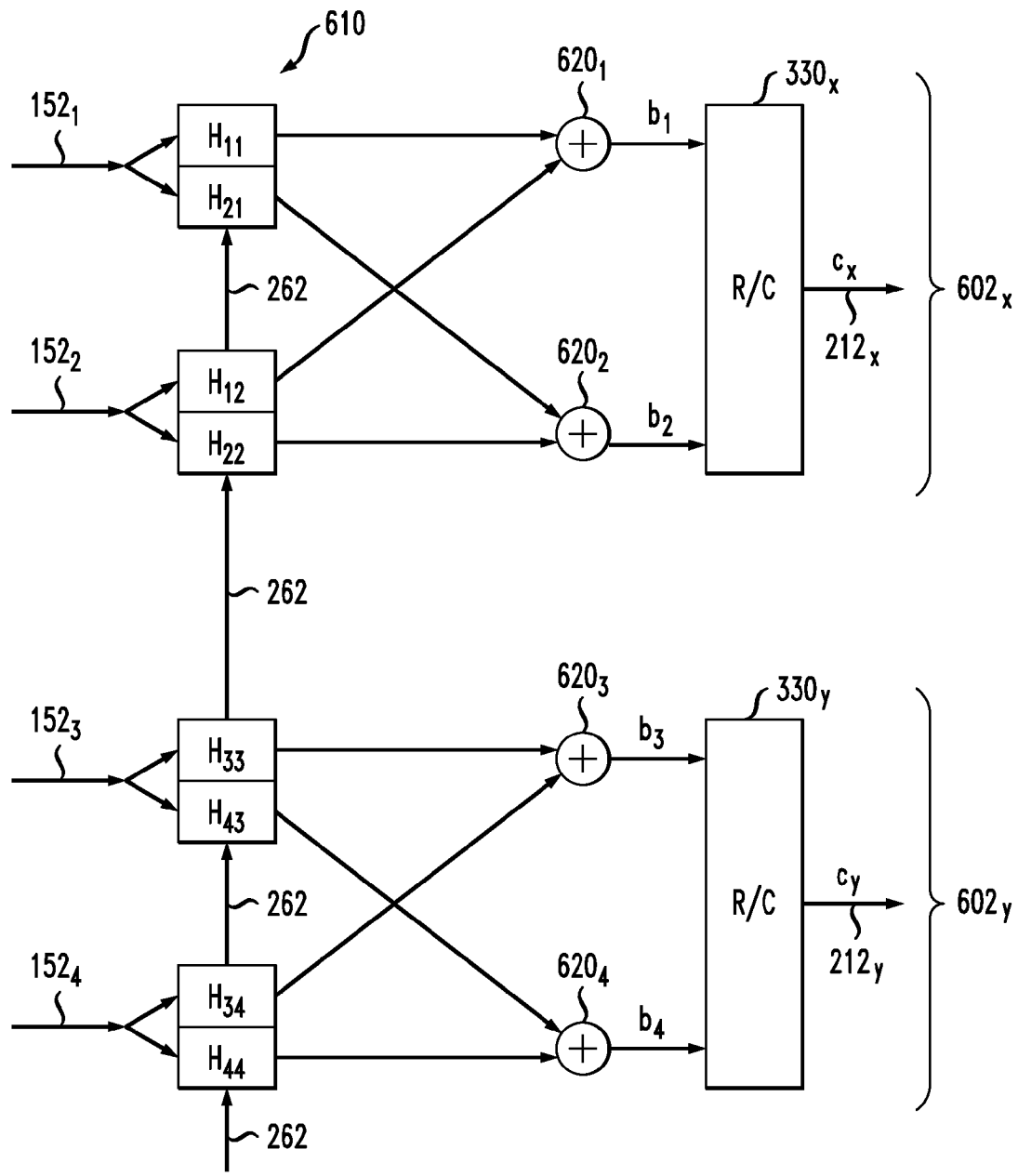
FIG. 6 shows a block diagram of an equalizer that can be used in the digital signal processor of FIG. 2 according to an alternative embodiment of the disclosure.

FIG. 6 shows a block diagram of an equalizer 600 that can be used as equalizer 210 (FIG. 2) according to an alternative embodiment of the disclosure. For illustration purposes, equalizer 600 is shown in FIG. 6 as being configured to receive digital signals $152_1$-$152_4$ and to output the generated complex values $c_x$ and $c_y$ on lines 212x and 212y, respectively, of bus 212 (also see FIG. 2). As further explained below, e.g., in reference to FIG. 7, equalizer 600 can alternatively be configured to receive digitals signals different from digital signals $152_1$-$152_4$ and/or output the generated complex values on a bus different from bus 212.

Equalizer 600 comprises an array 610 of eight equalization filters, each marked in FIG. 6 using the filter's transfer function, $H_{ik}$, where ik=11, 21, 12, 22, 33, 43, 34, 44. Each individual equalization filter in array 610 can be implemented, e.g., using filter 400 (FIG. 4) or filter 500 (FIG. 5), or any other suitable filter, as indicated above. Together with adders $620_1$-$620_4$, filter array 610 implements the signal transform expressed by Eq. (1), wherein $H_{31}=H_{41}=H_{32}=H_{42}=H_{13}=H_{23}=H_{14}=H_{24}=0$. Equalizer 600 can also be viewed as a lesser-complexity embodiment of equalizer 300, wherein the eight individual equalization filters having zero-valued transfer functions have been removed from array 310.

Also note that equalizer 600 has two parallel signal-processing branches that do not feed signals into each other. More specifically, equalizer 600 has an X-polarization branch 602x comprising equalization filters [$H_{11}$], [$H_{21}$], [$H_{12}$], and [$H_{22}$], adders $620_1$-$620_2$, and R/C converter 330x. Equalizer 600 further has a Y-polarization branch 602y comprising equalization filters [$H_{33}$], [$H_{43}$], [$H_{34}$], and [$H_{44}$], adders $620_3$-$620_4$, and R/C converter 330y. Branch 602x is configured to handle signals that are derived only from digital signals $152_1$-$152_2$, and this branch does not handle signals derived from digital signals $152_3$-$152_4$. Similarly, branch 602y is configured to handle signals that are derived only from digital signals $152_3$-$152_4$, and this branch does not handle signals derived from digital signals $152_1$-$152_2$. This property of branches 602x and 602y enables each of these branches to function as an independent (e.g., separate) equalizer, and either of these branches can be used as an equalizer in a polarization-insensitive optical receiver (e.g., an optical receiver that is not configured to use polarization-division multiplexing).

Figure 7:
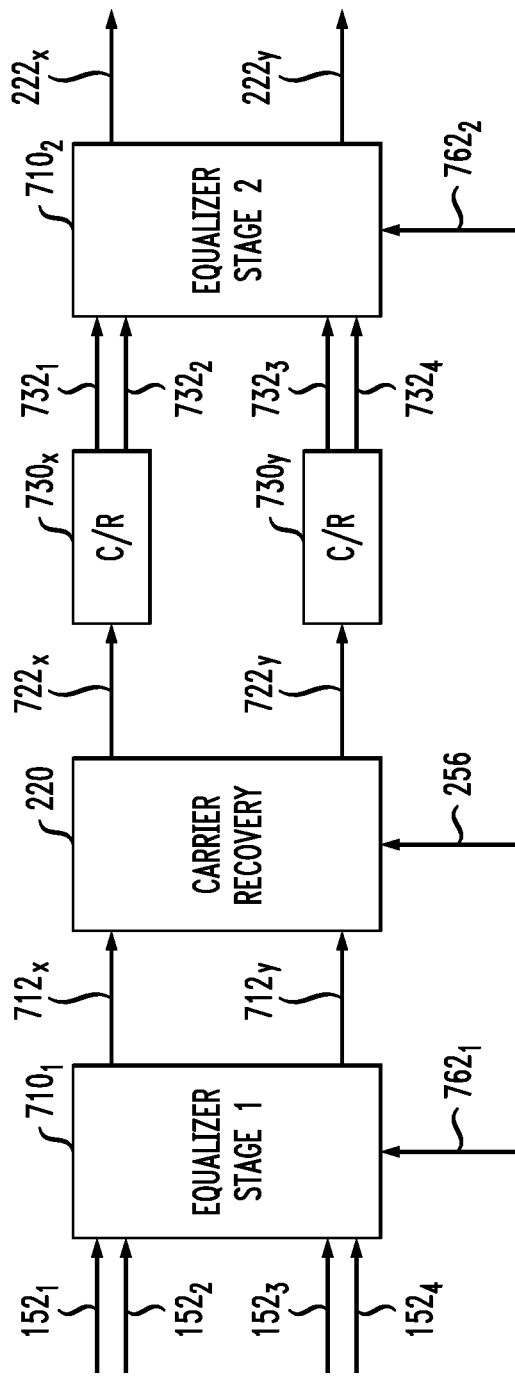
FIG. 7 shows a block diagram of an equalization and carrier-recovery (ECR) module that can be used in the digital signal processor of FIG. 2 according to yet another alternative embodiment of the disclosure.

FIG. 7 shows a block diagram of an equalization and carrier-recovery (ECR) module 700 that can be used to replace equalizer 210 and carrier-recovery circuit 220 in DSP 200 (FIG. 2) according to an alternative embodiment of the disclosure. ECR module 700 is configured to receive digital signals $152_1$-$152_4$ and to generate digital signals 222x and 222y (also see FIGS. 1 and 2). Copies of digital signals 222x and 222y generated by ECR module 700 are provided to decision circuit 230 and error estimator 250 as indicated in FIG. 2.

ECR module 700 comprises two equalizer stages $710_1$ and $710_2$, with carrier-recovery circuit 220 (also see FIG. 2) placed between them as indicated in FIG. 7. The respective configurations of equalizer stages $710_1$ and $710_2$ are individually controlled by a configuration controller (not explicitly shown in FIG. 7), via control signals $762_1$ and $762_2$. In one embodiment, the configuration controller configured to generate control signals $762_1$ and $762_2$ can be similar to controller 260 and use one or more feedback signals similar to feedback signal 258 (see FIG. 2).

Each of equalizer stages $710_1$ and $710_2$ is configured to (i) receive four respective real-valued input signals, (ii) apply time- or frequency-domain equalization processing to the received signals, and (iii) generate two complex-valued output signals. More specifically, equalizer stage $710_1$ is configured to receive real-valued signals $152_1$-$152_4$ and generate complex-valued output signals 712x and 712y. Equalizer stage $710_2$ is configured to receive real-valued input signals $732_1$-$732_4$ and generate complex-valued output signals 222x and 222y.

In one embodiment, carrier-recovery circuit 220 is configured to generate signals 722x and 722y in accordance with Eq. (4):

$$S_p^{(out)} = S_p^{(in)} \exp\left(-j\left(\int_t \Delta f \, dt + \varphi\right)\right) \quad (4)$$

where $S_p^{(in)}$ is a value from signal 712p; $S_p^{(out)}$ is a corresponding value in signal 722p; $\Delta f$ is the carrier-frequency offset between optical LO signal 112 and input signal 102 (see FIG. 1); t is time; $\phi$ is the phase error; and index p can be x or y.

Signals 722x and 722y generated by carrier-recovery circuit 220 are applied to complex-to-real (C/R) converters 730x and 730y, respectively. For each complex value supplied via signal 722x, C/R converter 730x outputs the real part of the complex value via signal $732_1$, and the imaginary part of the complex value via signal $732_2$. Similarly, for each complex value supplied via signal 722y, C/R converter 730y outputs the real part of the complex value via signal $732_3$, and the imaginary part of the complex value via signal $732_4$.

In one embodiment of ECR module 700, equalizer stage $710_1$ is a first copy of equalizer 300, and equalizer stage $710_2$ is a second copy of equalizer 300, with both copies configured to receive/generate the signals indicated in FIG. 7. In this embodiment, equalizer stage $710_1$ can be configured to compensate for receiver-induced impairments and, at least partially, for link-induced impairments, while equalizer stage $710_2$ can be configured to compensate for residual (if any) link-induced impairments and for transmitter-induced impairments.

In an alternative embodiment of ECR module 700, equalizer stage $710_1$ is a copy of equalizer 300, and equalizer stage $710_2$ is a copy of equalizer 600, with both copies configured to receive/generate the signals indicated in FIG. 7. In this embodiment, equalizer stage $710_1$ can be configured to compensate for receiver-induced impairments and link-induced impairments, while equalizer stage $710_2$ can be configured to compensate for transmitter-induced impairments.

In yet another alternative embodiment of ECR module 700, equalizer stage $710_1$ is a copy of equalizer 600, and equalizer stage $710_2$ is a copy of equalizer 300, with both copies configured to receive/generate the signals indicated in FIG. 7. In this embodiment, equalizer stage $710_1$ can be configured to compensate for receiver-induced impairments, while equalizer stage $710_2$ can be configured to compensate for link-induced impairments and transmitter-induced impairments.

Figure 8:
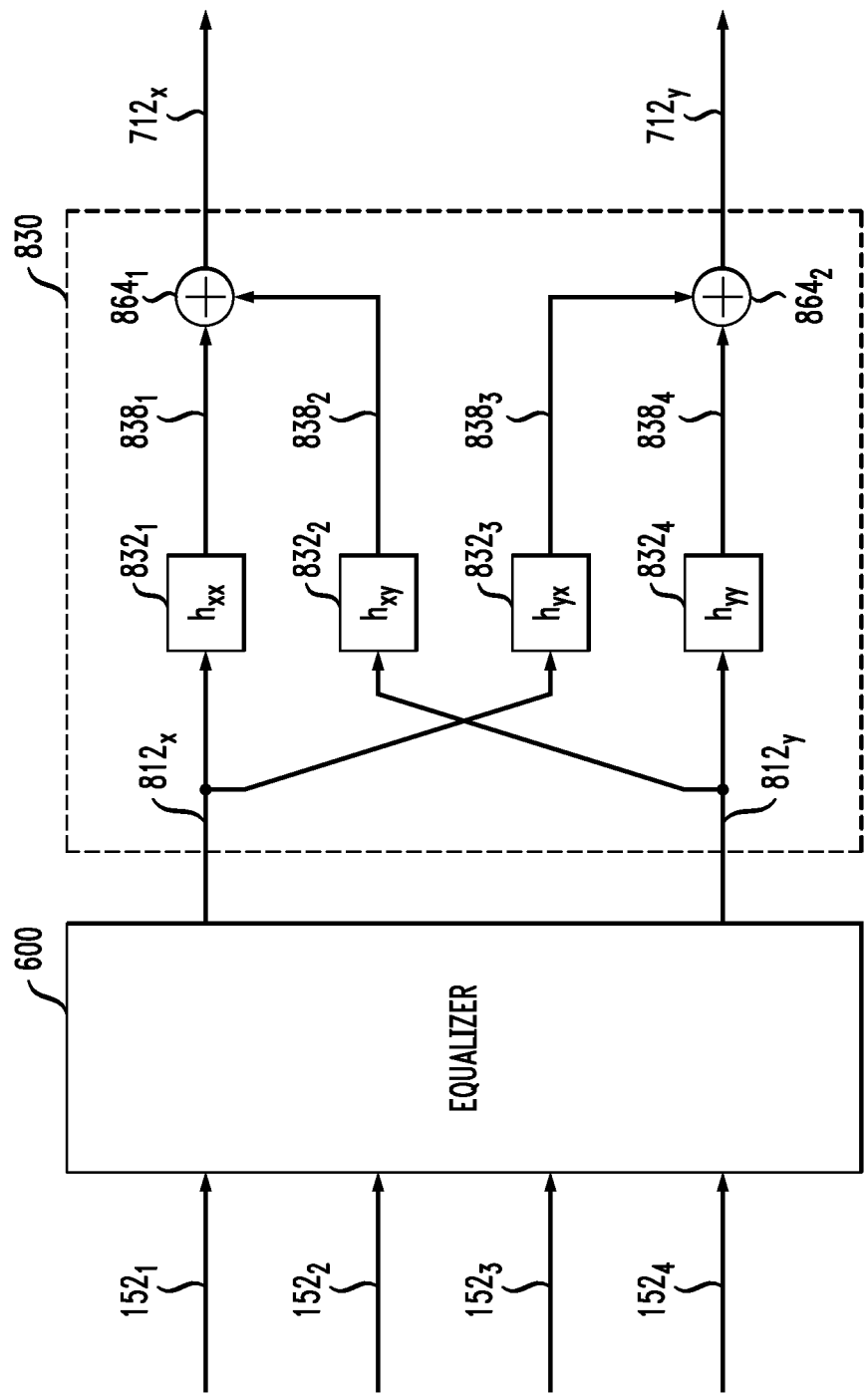
FIG. 8 shows a block diagram of an equalizer that can be used in the ECR module of FIG. 7 according to an embodiment of the disclosure.

In yet another alternative embodiment of ECR module 700, equalizer stage $710_1$ is a copy of equalizer 800 shown in FIG. 8, and equalizer stage $710_2$ is a copy of equalizer 300, with both copies configured to receive/generate the signals indicated in FIG. 7. In this embodiment, equalizer stage $710_1$ can be configured to compensate for receiver-induced impairments and link-induced impairments, while equalizer stage $710_2$ can be configured to compensate for transmitter-induced impairments.

Figure 9:
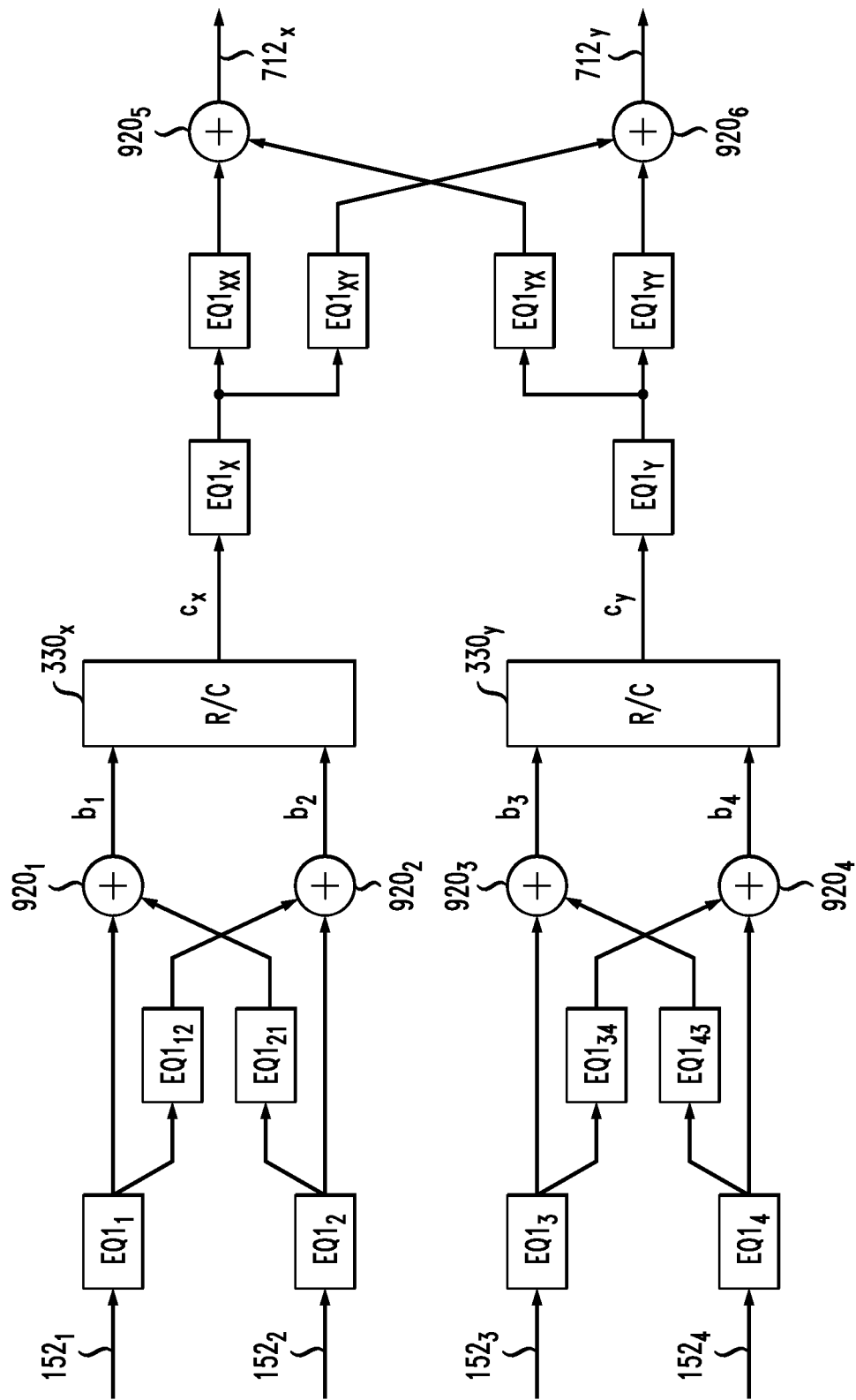
FIG. 9 shows a block diagram of an equalizer that can be used in the ECR module of FIG. 7 according to an alternative embodiment of the disclosure.

In yet another alternative embodiment of ECR module 700, equalizer stage $710_1$ is a copy of equalizer 900 shown in FIG. 9, and equalizer stage $710_2$ is a copy of equalizer 1000 shown in FIG. 10, with both copies configured to receive/generate the signals indicated in FIG. 7. In this embodiment, equalizer stages $710_1$ and $710_2$ can be configured to compensate for various impairments, e.g., as further explained below in reference to FIGS. 9 and 10.

FIG. 8 shows a block diagram of an equalizer 800 that can be used as equalizer stage $710_1$ (FIG. 7) according to an embodiment of the disclosure. Equalizer 800 comprises equalizer 600 (FIG. 6) and a butterfly equalizer 830 serially connected to one another as indicated in FIG. 8. In equalizer 800, equalizer 600 is configured to receive real-valued signals $152_1$-$152_4$ and to generate complex-valued signals 812x and 812y. Butterfly equalizer 830 is configured to receive complex-valued signals 812x and 812y and generate complex-valued signals 712x and 712y (also see FIG. 7).

The operation of equalizer 600 has been described above in reference to FIG. 6.

Butterfly equalizer 830 is configured to mix signals 812x and 812y, using equalization filters $832_1$-$832_4$ and adders $864_1$ and $864_2$, and to convert those signals into signals 712x and 712y in accordance with Eqs. (5a) and (5b):

$$X' = h_{xx} * X + h_{xy} * Y \quad (5a)$$

$$Y' = h_{yx} * X + h_{yy} * Y \quad (5b)$$

where X' is signal 712x; Y' is signal 712y; X is signal 812x; Y is signal 812y; the "*" symbol denotes the convolution operation; and h, $h_{xy}$, $h_{yx}$, and $h_{yy}$ are the transfer functions of equalization filters $832_1$-$832_4$, respectively. In operation, the individual transfer functions are set to configure butterfly equalizer 830 to perform polarization de-multiplexing. More specifically, butterfly equalizer 830 is configured to generate signals 712x and 712y so that: (i) signal 712x represents a first original PDM component generated at the remote transmitter with as little crosstalk from a second original PDM component generated at the remote transmitter as practically possible, and (ii) signal 712y represents the second original PDM component with as little crosstalk from the first PDM component as practically possible. Polarization de-multiplexing is usually used to undo, to a significant extent, the PDM-component mixing caused by (i) the usually present misalignment between the principal polarization axes of the remote transmitter and the principal polarization axes of receiver 100 and (ii) polarization rotation imposed onto optical input signal 102 in the optical fiber between the remote transmitter and receiver 100. In various embodiments, each individual equalization filter 832 can be implemented using FIR filter 400 (FIG. 4) or frequency-domain filter 500 (FIG. 5), wherein the used coefficients can be complex-valued.

In an additional alternative embodiment, equalizer 800 can be used to implement equalizer 210 (FIG. 2).

FIG. 9 shows a block diagram of an equalizer 900 that can be used as equalizer stage $710_1$ (FIG. 7) according to an alternative embodiment of the disclosure. Equalizer 900 comprises fourteen equalization filters $EQ1_q$ (where q=1, 2, 3, 4, 12, 21, 34, 43, X, Y, XX, XY, YX, YY), six adders $920_1$-$920_6$, and two R/C converters 330x and 330y interconnected as indicated in FIG. 9. Equalization filters $EQ1_1$, $EQ1_2$, $EQ1_3$, and $EQ1_4$ are configured to receive real-valued signals $152_1$-$152_4$, respectively. Adders $920_1$-$920_4$ are configured to receive and output real-valued signals, as indicated in FIG. 9. Adders $920_5$-$920_6$ are configured to receive and output complex-valued signals 712x and 712y (also see FIG. 7). The operation of R/C converters 330x and 330y has been described above in reference to FIG. 3 and Eqs. (2a)-(2b).

Equalization filters $EQ1_q$ with q=1, 2, 3, 4, 12, 21, 34, and 43 are configured to operate on real values. Equalization filters $EQ1_q$ with q=X, Y, XX, XY, YX, and YY are configured to operate on complex values. In various embodiments, each individual equalization filter EQ1 can be implemented using FIR filter 400 (FIG. 4) or frequency-domain filter 500 (FIG. 5). Note that equalization filters $EQ1_{XX}$, $EQ1_{XY}$, $EQ1_{YX}$, and $EQ1_{YY}$ and adders $920_5$-$920_6$ form a butterfly equalizer that is similar to butterfly equalizer 830 (FIG. 8).

In an alternative embodiment, the portion of equalizer 900 having equalization filters $EQ1_q$ with q=X, Y, XX, XY, YX, and YY and adders $920_5$-$920_6$ can be removed from the equalizer structure. In other alternative embodiments, the portion of equalizer 900 having equalization filters $EQ1_q$ with q=X, Y, XX, XY, YX, and YY and adders $920_5$-$920_6$ and the portion of equalizer 900 having equalization filters $EQ1_q$ with q=1, 2, 3, 4, 12, 21, 34, 43 and adders $920_1$-$920_4$ can be used separately or connected to each other in a different manner than that shown in FIG. 9.

When equalizer 900 is used as equalizer stage $710_1$, the equalizer's structure shown in FIG. 9 lends itself to being configured, in a relatively straightforward manner, to compensate the following impairments:

Equalization filters $EQ1_1$, $EQ1_2$, $EQ1_3$, and $EQ1_4$ can be configured to compensate for relative differences in the I and Q paths in the front end of receiver 100.

Equalization filters $EQ1_{12}$ and $EQ1_{21}$ can be configured to compensate for the I/Q imbalances in the X-polarization branch of receiver 100. Equalization filters $EQ1_{34}$ and $EQ1_{43}$ can similarly be configured to compensate for the I/Q imbalances in the Y-polarization branch of receiver 100.

Equalization filters $EQ1_X$ and $EQ1_Y$ can be configured to compensate for the link-induced impairments that are common to both polarizations of optical signal 102. One example of such a common impairment is chromatic dispersion.

Equalization filters $EQ1_{XX}$, $EQ1_{XY}$, $EQ1_{YX}$, and $EQ1_{YY}$ can be configured to compensate for polarization rotation in the link, thereby enabling polarization de-multiplexing. If each of these filters has a sufficiently large number (N) of taps, then the butterfly equalizer formed by these filters can also be used to reduce the adverse effects of polarization-mode dispersion, polarization-dependent loss, inter-symbol interference, and residual (e.g., left uncompensated after equalization filters $EQ1_X$ and $EQ1_Y$) chromatic dispersion.

In an additional alternative embodiment, equalizer 900 can be used to implement equalizer 210 (FIG. 2).

FIG. 10 shows a block diagram of an equalizer 1000 that can be used as equalizer stage $710_2$ (FIG. 7) according to an alternative embodiment of the disclosure. Equalizer 1000 comprises eight equalization filters $EQ2_q$ (where q=1, 2, 3, 4, 12, 21, 34, 43), four adders $1020_1$-$1020_4$, and two R/C converters 330x and 330y interconnected as indicated in FIG. 10. Equalization filters $EQ2_{12}$, $EQ2_{21}$, $EQ2_{34}$, and $EQ2_{43}$ are configured to receive real-valued signals $732_1$-$732_4$, respectively (also see FIG. 7). Copies of signals $732_1$-$732_4$ are also applied to adders $1020_1$-$1020_4$, respectively. Adders $1020_1$-$1020_4$ are configured to receive and output real-valued signals, as indicated in FIG. 10. R/C converters 330x and 330y has are configured to generate and output complex-valued signals 222x and 222y (also see FIG. 7). In various embodiments, each individual equalization filter EQ2 can be implemented using FIR filter 400 (FIG. 4) or frequency-domain filter 500 (FIG. 5).

The operation of R/C converters 330x and 330y has been described above in reference to FIG. 3 and Eqs. (2a)-(2b).

When equalizer 1000 is used as equalizer stage $710_2$, the equalizer's structure shown in FIG. 10 lends itself to being configured, in a relatively straightforward manner, to compensate the following impairments:

Equalization filters $EQ2_{12}$ and $EQ2_{21}$ can be configured to compensate for the I/Q imbalances in the X-polarization branch of the remote transmitter.

Equalization filters $EQ2_{34}$ and $EQ2_{43}$ can similarly be configured to compensate for the I/Q imbalances in the Y-polarization branch of the remote transmitter.

Equalization filters $EQ2_1$, $EQ2_2$, $EQ3_3$, and $EQ4_4$ can be configured to compensate for relative differences in the I and Q paths in the remote transmitter.

While various aspects of this invention have been described with reference to illustrative embodiments, this description is not intended to be construed in a limiting sense.

While numerous embodiments of equalizers and equalizer stages have been described above, various additional embodiments can be constructed using the various circuits and/or circuit components disclosed herein. For example, ECR module 700 (FIG. 7) can be modified to include one or more additional equalizer stages. Another possible modification of ECR module 700 (FIG. 7) is to insert butterfly equalizer 830 shown in FIG. 8 between carrier-recovery circuit 220 and C/R converters 730x and 730y of that ECR module.

Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

What is claimed is:

1. An apparatus comprising:
an optical-to-electrical converter configured to mix an optical input signal and an optical local-oscillator signal to generate a first electrical digital measure and a second electrical digital measure of the optical input signal; and
a digital processor configured to process the first and second electrical digital measures to recover data carried by the optical input signal, wherein the digital processor comprises:
a first equalization filter configured to apply respective signal-equalization processing to the first electrical digital measure to generate a first processed signal;
a second equalization filter configured to apply respective signal-equalization processing to the first electrical digital measure to generate a second processed signal;
a third equalization filter configured to apply respective signal-equalization processing to the second electrical digital measure to generate a third processed signal; and
a fourth equalization filter configured to apply respective signal-equalization processing to the second electrical digital measure to generate a fourth processed signal; and
wherein the digital processor is further configured to:
combine the first processed signal and the third processed signal to generate a real part of a first complex-valued digital measure;
combine the second processed signal and the fourth processed signal to generate an imaginary part of the first complex-valued digital measure; and
recover the data carried by the optical input signal based on the first complex-valued digital measure.

2. The apparatus of claim 1, wherein each of the first, second, third, and fourth processed signals is a real-valued signal.

3. The apparatus of claim 1, wherein each of the first and second electrical digital measures is a real-valued electrical digital measure.

4. The apparatus of claim 1, wherein the digital processor further comprises:
- a first adder configured to sum the first and third processed signals to generate the real part;
- a second adder configured to sum the second and fourth processed signals to generate the imaginary part; and
- a real-to-complex converter configured to combine the real part and the imaginary part to generate the first complex-valued digital measure.

5. The apparatus of claim 1, wherein each of the first, second, third and fourth equalization filters comprises a respective finite-impulse-response filter having a tapped delay line.

6. The apparatus of claim 1, wherein each of the first, second, third and fourth equalization filters comprises a respective frequency-domain filter configured to perform a Fourier transform.

7. The apparatus of claim 1,
wherein the optical-to-electrical converter is further configured to mix the optical input signal and the optical local-oscillator signal to generate a third electrical digital measure and a fourth electrical digital measure of the optical input signal;
wherein the digital processor further comprises:
- a fifth equalization filter configured to apply respective signal-equalization processing to the third electrical digital measure to generate a fifth processed signal;
- a sixth equalization filter configured to apply respective signal-equalization processing to the fourth electrical digital measure to generate a sixth processed signal; and
wherein the digital processor is further configured to combine the first processed signal, the third processed signal, the fifth processed signal, and the sixth processed signal to generate the real part of the first complex-valued digital measure.

8. The apparatus of claim 1,
wherein the optical-to-electrical converter is further configured to mix the optical input signal and the optical local-oscillator signal to generate a third electrical digital measure of the optical input signal;
wherein the digital processor further comprises:
- a fifth equalization filter configured to apply respective signal-equalization processing to the third electrical digital measure to generate a fifth processed signal;
- a sixth equalization filter configured to apply respective signal-equalization processing to the third electrical digital measure to generate a sixth processed signal; and
wherein the digital processor is further configured to:
- combine the first processed signal, the third processed signal, and the fifth processed signal to generate the real part of the first complex-valued digital measure;
- combine the second processed signal, the fourth processed signal, and the sixth processed signal to generate the imaginary part of the first complex-valued digital measure.

9. The apparatus of claim 1,
wherein the optical-to-electrical converter is further configured to mix the optical input signal and the optical local-oscillator signal to generate a third electrical digital measure and a fourth electrical digital measure of the optical input signal;
wherein the digital processor further comprises:
- a fifth equalization filter configured to apply respective signal-equalization processing to the third electrical digital measure to generate a fifth processed signal;
- a sixth equalization filter configured to apply respective signal-equalization processing to the fourth electrical digital measure to generate a sixth processed signal; and
wherein the digital processor is further configured to combine the second processed signal, the fourth processed signal, the fifth processed signal, and the sixth processed signal to generate the imaginary part of the first complex-valued digital measure.

10. The apparatus of claim 1,
wherein the optical-to-electrical converter is further configured to mix the optical input signal and the optical local-oscillator signal to generate a third electrical digital measure and a fourth electrical digital measure of the optical input signal;
wherein the digital processor further comprises:
- a fifth equalization filter configured to apply respective signal-equalization processing to the third electrical digital measure to generate a fifth processed signal;
- a sixth equalization filter configured to apply respective signal-equalization processing to the third electrical digital measure to generate a sixth processed signal;
- a seventh equalization filter configured to apply respective signal-equalization processing to the fourth electrical digital measure to generate a seventh processed signal; and
- a eighth equalization filter configured to apply respective signal-equalization processing to the fourth electrical digital measure to generate an eighth processed signal; and
wherein the digital processor is further configured to:
- combine the first processed signal, the third processed signal, the fifth processed signal, and the seventh processed signal to generate the real part of the first complex-valued digital measure; and
- combine the second processed signal, the fourth processed signal, the sixth processed signal, and the eighth processed signal to generate the imaginary part of the first complex-valued digital measure.

11. The apparatus of claim 10, wherein:
the first and second electrical digital measure correspond to a first polarization of the optical input signal; and
the third and fourth electrical digital measure correspond to a second polarization of the optical input signal, said second polarization being orthogonal to the first polarization.

12. The apparatus of claim 1,
wherein the optical-to-electrical converter is further configured to mix the optical input signal and the optical local-oscillator signal to generate a third electrical digital measure and a fourth electrical digital measure of the optical input signal;
wherein the digital processor is further configured to process the third and fourth electrical digital measures to generate a second complex-valued digital measure; and
wherein the digital processor further comprises a butterfly equalizer configured to process the first and second complex-valued digital measures to generate a third complex-valued digital measure and a fourth complex-valued digital measure in a manner that causes (i) the third complex-valued digital measure to represent a first polarization-division-multiplexed component of the optical input signal and (ii) the fourth complex-valued digital measure to represent a second polarization-division-multiplexed component of the optical input signal.

13. The apparatus of claim 12, wherein the butterfly equalizer comprises:
- a fifth equalization filter configured to apply respective signal-equalization processing to the first complex-valued digital measure to generate a fifth complex-valued digital measure;
- a sixth equalization filter configured to apply respective signal-equalization processing to the second complex-valued digital measure to generate a sixth complex-valued digital measure;
- a seventh equalization filter configured to apply respective signal-equalization processing to the first complex-valued digital measure to generate a seventh complex-valued digital measure;
- an eighth equalization filter configured to apply respective signal-equalization processing to the second complex-valued digital measure to generate an eighth complex-valued digital measure;
- a first adder configured to sum the fifth complex-valued digital measure and the sixth complex-valued digital measure to generate the third complex-valued digital measure; and
- a second adder configured to sum the seventh complex-valued digital measure and the eighth complex-valued digital measure to generate the fourth complex-valued digital measure.

14. The apparatus of claim 1,
wherein the digital processor comprises:
- a first equalizer stage configured to generate the first complex-valued digital measure, said first equalizer stage including the first, second, third, and fourth equalization filters;
- a digital circuit configured to apply frequency-offset processing to the first complex-valued digital measure to generate a second complex-valued digital measure, with said frequency-offset processing being directed at reducing effects of a carrier-frequency mismatch between the optical input signal and the optical local-oscillator signal; and
- a second equalizer stage configured to apply respective signal-equalization processing to a real part and an imaginary part of the second complex-valued digital measure to generate a third complex-valued digital measure; and
wherein the digital processor is further configured to recover the data carried by the optical input signal based on the third complex-valued digital measure.

15. The apparatus of claim 14,
wherein the second equalizer stage comprises:
- a fifth equalization filter configured to apply respective signal-equalization processing to the real part of the second complex-valued digital measure to generate a fifth processed signal;
- a sixth equalization filter configured to apply respective signal-equalization processing to the real part of the second complex-valued digital measure to generate a sixth processed signal;
- a seventh equalization filter configured to apply respective signal-equalization processing to the imaginary part of the second complex-valued digital measure to generate a seventh processed signal; and
- an eighth equalization filter configured to apply respective signal-equalization processing to the imaginary part of the second complex-valued digital measure to generate an eighth processed signal; and
wherein the second equalizer stage is further configured to:
- combine the fifth processed signal and the seventh processed signal to generate a real part of the third complex-valued digital measure; and
- combine the sixth processed signal and the eighth processed signal to generate an imaginary part of the third complex-valued digital measure.

16. The apparatus of claim 15, wherein each of the fifth, sixth, seventh, and eighth equalization filters comprises a respective finite-impulse-response filter.

17. The apparatus of claim 15, wherein each of the fifth, sixth, seventh, and eighth processed signals is a real-valued signal.

18. The apparatus of claim 15,
wherein the second equalizer stage further comprises a butterfly equalizer configured to process the third complex-valued digital measure to generate a fourth complex-valued digital measure in a manner that causes the fourth complex-valued digital measure to represent a first polarization-division-multiplexed component of the optical input signal; and
wherein the digital processor is further configured to recover the data carried by the optical input signal based on the fourth complex-valued digital measure.

19. The apparatus of claim 14,
wherein the second equalizer stage comprises a butterfly equalizer configured to process the second complex-valued digital measure to generate a fourth complex-valued digital measure in a manner that causes the fourth complex-valued digital measure to represent a first polarization-division-multiplexed component of the optical input signal; and
wherein the second equalizer stage is further configured to apply respective signal-equalization processing to a real part and an imaginary part of the fourth complex-valued digital measure to generate the third complex-valued digital measure.

* * * * *